US012447908B2

(12) United States Patent
Joseph et al.

(10) Patent No.: US 12,447,908 B2
(45) Date of Patent: *Oct. 21, 2025

(54) VEHICULAR TRAILER HITCHING ASSIST SYSTEM

(71) Applicant: Magna Electronics Inc., Auburn Hills, MI (US)

(72) Inventors: Harold E. Joseph, Brampton (CA); Jyothi P. Gali, Rochester Hills, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/444,834

(22) Filed: Feb. 19, 2024

(65) Prior Publication Data

US 2024/0190359 A1 Jun. 13, 2024

Related U.S. Application Data

(63) Continuation of application No. 15/929,646, filed on May 14, 2020, now Pat. No. 11,904,778.

(60) Provisional application No. 62/847,532, filed on May 14, 2019.

(51) Int. Cl.
*B60D 1/28* (2006.01)
*B60D 1/06* (2006.01)
*B60D 1/64* (2006.01)
*B60R 1/00* (2022.01)
*B60R 11/04* (2006.01)

(52) U.S. Cl.
CPC ............... *B60R 11/04* (2013.01); *B60D 1/28* (2013.01); *B60D 1/64* (2013.01); *B60R 1/003* (2013.01); *B60D 1/06* (2013.01)

(58) Field of Classification Search
CPC .......... B60R 11/04; B60R 1/003; B60D 1/28; B60D 1/64; B60D 1/06
USPC .......................................................... 382/104
See application file for complete search history.

(56) References Cited

U.S. PATENT DOCUMENTS

| 5,550,677 A | 8/1996 | Schofield et al. |
| 5,670,935 A | 9/1997 | Schofield et al. |
| 5,949,331 A | 9/1999 | Schofield et al. |
| 6,690,268 B2 | 2/2004 | Schofield et al. |

(Continued)

FOREIGN PATENT DOCUMENTS

| WO | 2002080558 A1 | 10/2002 | |
| WO | WO-2018150642 A1 * | 8/2018 | ............... B60D 1/36 |

*Primary Examiner* — Jacob D Knutson
(74) *Attorney, Agent, or Firm* — HONIGMAN LLP

(57) ABSTRACT

A vehicular trailer hitching assist system includes a rear backup camera disposed at a rear portion of a vehicle. At least a hitching portion of a trailer hitched to a hitch of the vehicle is viewed by the rear backup camera. Image data captured by the rear backup camera is processed at an image processor. The vehicular trailer hitching assist system, via processing at the image processor of the image data captured by the rear backup camera, determines an incorrect connection of the hitching portion of the trailer to the hitch of the vehicle. The vehicular trailer hitching assist system, responsive to determination of the incorrect connection of the hitching portion of the trailer to the hitch of the vehicle, limits operation of the vehicle or alerts a driver of the vehicle of the determined incorrect connection of the hitching portion of the trailer to the hitch of the vehicle.

32 Claims, 2 Drawing Sheets

(56) References Cited

U.S. PATENT DOCUMENTS

| | | | |
|---|---|---|---|
| 7,005,974 B2 | 2/2006 | McMahon et al. | |
| 7,038,577 B2 | 5/2006 | Pawlicki et al. | |
| 7,720,580 B2 | 5/2010 | Higgins-Luthman | |
| 7,855,755 B2 | 12/2010 | Weller et al. | |
| 8,038,166 B1 | 10/2011 | Piesinger | |
| 8,191,915 B2 | 6/2012 | Freese, V et al. | |
| 9,085,261 B2 | 7/2015 | Lu et al. | |
| 9,156,496 B2 | 10/2015 | Greenwood et al. | |
| 9,446,713 B2 | 9/2016 | Lu et al. | |
| 9,558,409 B2 | 1/2017 | Pliefke et al. | |
| 9,683,848 B2 | 6/2017 | Lavoie et al. | |
| 10,086,870 B2 | 10/2018 | Gieseke et al. | |
| 10,160,382 B2 | 12/2018 | Pliefke et al. | |
| 10,407,047 B2 | 9/2019 | Chundrlik, Jr. et al. | |
| 10,532,698 B2 | 1/2020 | Potnis et al. | |
| 10,552,976 B2 | 2/2020 | Diessner et al. | |
| 10,586,119 B2 | 3/2020 | Pliefke et al. | |
| 10,632,919 B2 | 4/2020 | Ling et al. | |
| 10,638,025 B2 | 4/2020 | Gali et al. | |
| 10,706,291 B2 | 7/2020 | Diessner et al. | |
| 10,733,757 B2 | 8/2020 | Gupta et al. | |
| 10,755,110 B2 | 8/2020 | Bajpai | |
| 10,863,335 B2 | 12/2020 | Koravadi | |
| 10,870,323 B2 | 12/2020 | Niewiadomski et al. | |
| 11,077,795 B2 | 8/2021 | Jales Costa et al. | |
| 11,155,298 B2 | 10/2021 | Niewiadomski et al. | |
| 11,277,558 B2 | 3/2022 | Fluegel | |
| 11,383,567 B2 | 7/2022 | Yoshizaki | |
| 11,385,651 B2 | 7/2022 | Niewiadomski et al. | |
| 11,904,778 B2 | 2/2024 | Joseph et al. | |
| 2011/0216199 A1 | 9/2011 | Trevino et al. | |
| 2015/0002670 A1* | 1/2015 | Bajpai | G06V 20/56 |
| | | | 348/148 |
| 2015/0077557 A1 | 3/2015 | Han et al. | |
| 2015/0321666 A1 | 11/2015 | Talty et al. | |
| 2016/0023601 A1 | 1/2016 | Windeler | |
| 2016/0052548 A1 | 2/2016 | Singh et al. | |
| 2016/0257341 A1* | 9/2016 | Lavoie | B60W 30/18036 |
| 2016/0288601 A1* | 10/2016 | Gehrke | B60Q 5/006 |
| 2016/0375831 A1 | 12/2016 | Wang et al. | |
| 2017/0174131 A1 | 6/2017 | Sigle | |
| 2017/0217372 A1 | 8/2017 | Lu et al. | |
| 2017/0254873 A1 | 9/2017 | Koravadi | |
| 2018/0081370 A1 | 3/2018 | Miller et al. | |
| 2018/0215382 A1 | 8/2018 | Gupta et al. | |
| 2018/0253608 A1 | 9/2018 | Diessner et al. | |
| 2018/0276838 A1 | 9/2018 | Gupta et al. | |
| 2019/0064831 A1 | 2/2019 | Gali et al. | |
| 2019/0118595 A1 | 4/2019 | Yoshizaki | |
| 2019/0118860 A1 | 4/2019 | Gali et al. | |
| 2019/0176553 A1* | 6/2019 | Ghannam | B60Q 9/00 |
| 2019/0297233 A1 | 9/2019 | Gali et al. | |
| 2019/0308473 A1 | 10/2019 | Yu et al. | |
| 2019/0347825 A1 | 11/2019 | Gupta et al. | |
| 2019/0378282 A1 | 12/2019 | Rogan | |
| 2019/0391590 A1* | 12/2019 | Niewiadomski | B60D 1/06 |
| 2020/0017143 A1 | 1/2020 | Gali | |
| 2020/0023696 A1 | 1/2020 | Ling et al. | |
| 2020/0031398 A1 | 1/2020 | Maruoka et al. | |
| 2020/0039517 A1 | 2/2020 | Berkemeier et al. | |
| 2020/0108679 A1 | 4/2020 | Golgiri et al. | |
| 2020/0130582 A1 | 4/2020 | Wong et al. | |
| 2020/0171897 A1 | 6/2020 | Xu et al. | |
| 2020/0247470 A1 | 8/2020 | Dottavio et al. | |
| 2020/0334475 A1 | 10/2020 | Joseph et al. | |
| 2020/0353864 A1 | 11/2020 | Niewiadomski et al. | |
| 2020/0356788 A1 | 11/2020 | Joseph et al. | |
| 2021/0034902 A1 | 2/2021 | Assa et al. | |
| 2021/0039460 A1 | 2/2021 | Niewiadomski et al. | |
| 2021/0053568 A1 | 2/2021 | Niewiadomski et al. | |
| 2021/0061281 A1 | 3/2021 | Niewiadomski et al. | |
| 2021/0078634 A1 | 3/2021 | Jalalmaab et al. | |
| 2021/0094473 A1 | 4/2021 | Gali et al. | |
| 2021/0114521 A1 | 4/2021 | Niewiadomski et al. | |
| 2021/0129752 A1 | 5/2021 | Raeis Hosseiny et al. | |
| 2021/0155238 A1 | 5/2021 | Yu et al. | |
| 2021/0170947 A1 | 6/2021 | Yunus et al. | |
| 2021/0213791 A1 | 7/2021 | Ionascu | |
| 2021/0339588 A1 | 11/2021 | Takahama | |
| 2022/0024391 A1 | 1/2022 | Gali et al. | |
| 2022/0027644 A1 | 1/2022 | Gali et al. | |
| 2022/0028111 A1 | 1/2022 | Gali et al. | |
| 2022/0135127 A1 | 5/2022 | Lu et al. | |

\* cited by examiner

VEHICULAR TRAILER HITCHING ASSIST SYSTEM

CROSS REFERENCE TO RELATED APPLICATIONS

The present application is a continuation of U.S. patent application Ser. No. 15/929,646, filed May 14, 2020, now U.S. Pat. No. 11,904,778, which claims the filing benefits of U.S. provisional application Ser. No. 62/847,532, filed May 14, 2019, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Trailer assist systems are known that may determine an angle of a trailer hitched at a vehicle. Examples of such known systems are described in U.S. Pat. Nos. 9,085,261 and/or 6,690,268, which are hereby incorporated herein by reference in their entireties.

SUMMARY OF THE INVENTION

The present invention provides a driver assistance system or vision system or imaging system for a vehicle that utilizes a camera disposed at a rear portion of a vehicle and having a field of view exterior of the vehicle, the field of view encompassing at least a portion of a trailer hitched to the vehicle. The system also includes a control comprising electronic circuitry that includes a processor operable to process image data captured by the camera, with the image data captured by the camera representative of the trailer hitched to the vehicle. The control, responsive to image processing of image data captured by the camera, determines at least one deficiency in a hitch connection between the vehicle and the hitching portion of the trailer. The control, responsive to determination of the deficiency, alerts a driver of the vehicle of the determined deficiency.

These and other objects, advantages, purposes and features of the present invention will become apparent upon review of the following specification in conjunction with the drawings.

DESCRIPTION OF THE PREFERRED EMBODIMENTS

A vehicle and trailer maneuvering system or maneuver assist system and/or driving assist system operates to capture images exterior of the vehicle and of a trailer being towed by the vehicle and may process the captured image data to determine a path of travel for the vehicle and trailer and to detect objects at or near the vehicle and in the predicted path of the vehicle, such as to assist a driver of the vehicle in maneuvering the vehicle and trailer in a rearward direction. The vision system includes an image processor or image processing system that is operable to receive image data from one or more cameras and that may provide an output to a display device for displaying images representative of the captured image data. Optionally, the vision system may provide a display, such as a rearview display or a top down or bird's eye or surround view display or the like.

Figure 1:
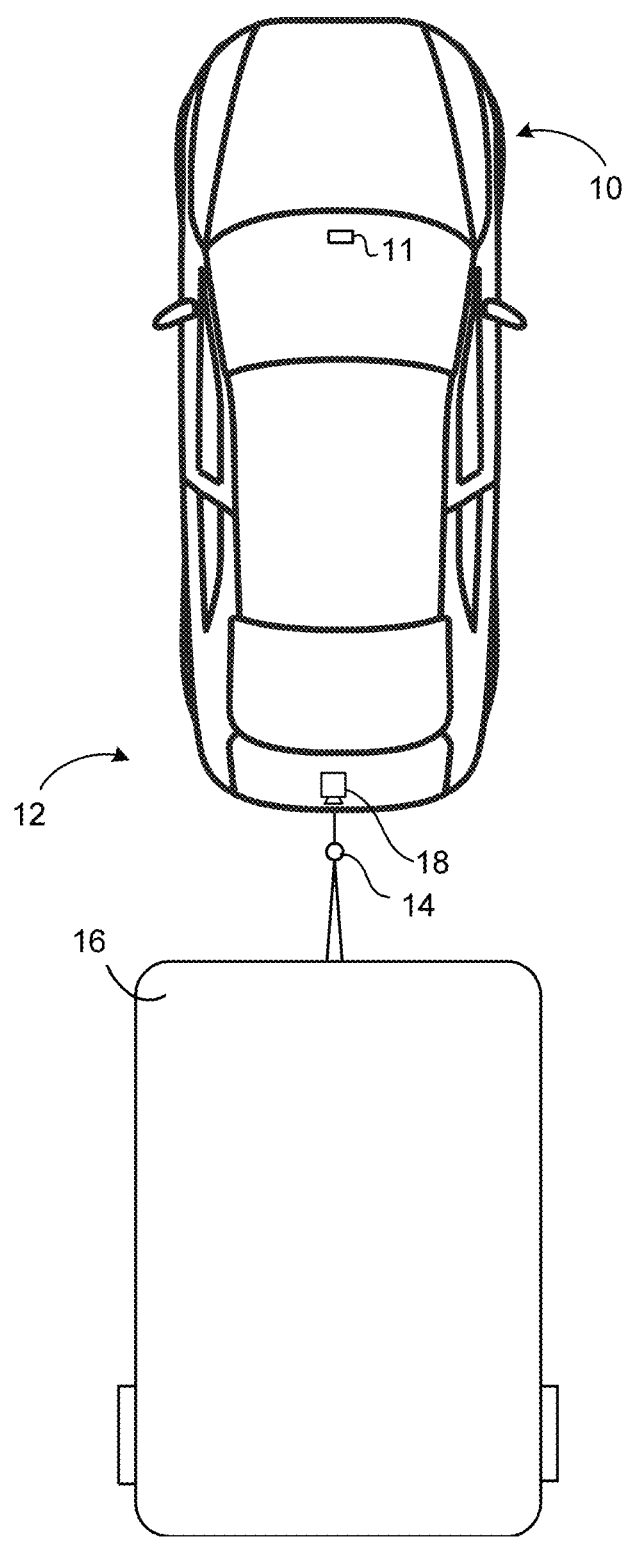
FIG. 1 is a plan view of a vehicle with a trailer assist system that is operable to steer a trailer along a trailer direction in accordance with the present invention.

Referring now to the drawings and the illustrative embodiments depicted therein, a vehicle 10 includes a driving assist system 12 (such as part of a rear backup assist system) that is operable to assist in backing up or reversing the vehicle with a hitched trailer that is hitched at the rear of the vehicle via a trailer hitch 14, and the system may maneuver the vehicle 10 and trailer 16 toward a desired or selected location. The driving assist system 12 includes at least one exterior viewing vehicle-based imaging sensor or camera, such as a rearward viewing imaging sensor or camera 18, which may comprise a rear backup camera of the vehicle (and the system may optionally include multiple exterior viewing imaging sensors or cameras, such as a sideward/rearward viewing camera at respective sides of the vehicle), which captures image data representative of the scene exterior and at least rearward of the vehicle 10, with the field of view of the camera encompassing the trailer hitch 14 and/or trailer 16, and with the camera 18 having a lens for focusing images at or onto an imaging array or imaging plane or imager of the camera (FIG. 1). Optionally, a forward viewing camera may be disposed at the windshield of the vehicle 10 and view through the windshield and forward of the vehicle 10, such as for a machine vision system (such as for traffic sign recognition, headlamp control, pedestrian detection, collision avoidance, lane marker detection and/or the like). The driving assist system 12 includes a control 11 or electronic control unit (ECU) having electronic circuitry and associated software. The electronic circuitry includes a processor that is operable to process image data captured by the camera or cameras and that may detect objects or the like and/or provide displayed images at a display device for viewing by the driver of the vehicle (the control and/or display device may be part of or incorporated in or at an interior rearview mirror assembly of the vehicle, or the control and/or the display device may be disposed elsewhere at or in the vehicle). The data transfer or signal communication from the camera to the ECU may comprise any suitable data or communication link, such as a vehicle network bus or the like of the equipped vehicle.

Properly connecting or hitching the trailer to a hitch ball of the trailer hitch at the vehicle is both an important and strenuous task. Because of the painful nature, it is common for errors to occur. For example, an operator often forgets to connect key components to the vehicle and the hitch. For example, operators failing to properly seat the trailer tongue onto the hitch ball and failing to lock the trailer latch to secure the trailer tongue on the hitch ball are all common mistakes. Implementations of the present invention utilize a rear camera of the vehicle to verify the connection between the trailer and the hitch.

Figure 2B:
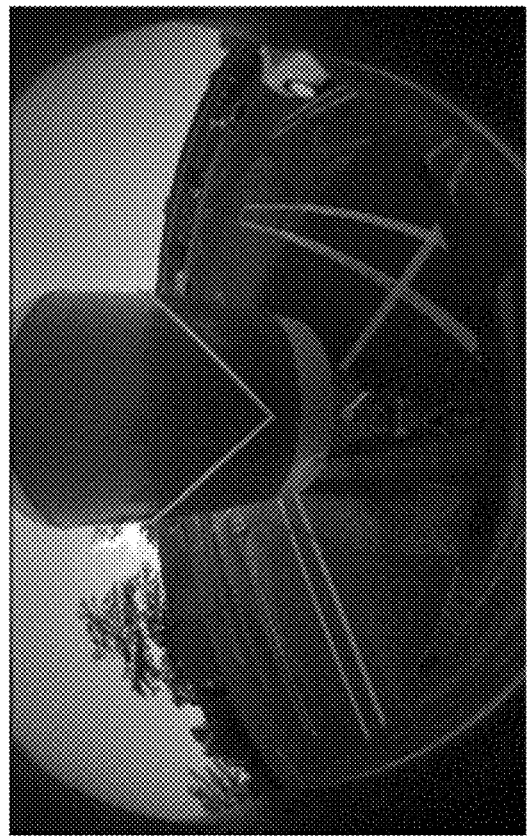
FIGS. 2A and 2B are exemplary deficiencies determined by the trailer assist system of FIG. 1.
Figure 2A:
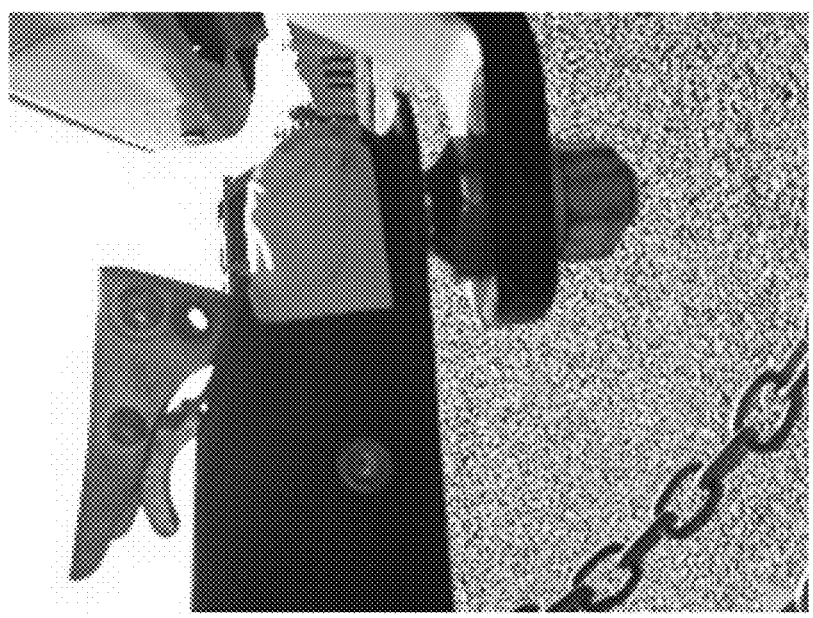

Referring now to FIGS. 2A and 2B, the rearward viewing camera captures image data representative of the trailer hitch. The control processes the captured image data to detect for deficiencies in the connection between the trailer and the trailer hitch. For example, the control may (via processing of captured image data) detect or determine trailer beam hitch fixation on the hitch (FIG. 2A). That is, the control may perform a gap analysis to determine if the trailer tongue is properly seated on the hitch ball of the hitch (i.e., determine if a gap is present between the hitch ball and the trailer tongue) or other hitching deficiency, such as when the trailer tongue locking mechanism is not properly set to lock or retain the trailer tongue at the hitch ball of the vehicle. In another example, the control may determine or detect if chains (e.g., the safety chains at a trailer tongue region that are supposed to be hooked or clipped or otherwise connected to a rear portion of the vehicle, such as at or near the hitch ball) are present and/or properly connected between the vehicle and the trailer (FIG. 2B) or if the hitch lock (the latch or lock that is typically pivoted to a locking position to retain the trailer tongue on the hitch ball) is properly engaged (FIG. 2A). In yet another example, the control may determine if any wires or cables (e.g., the wire harness of the trailer that plugs into a connector of a wire harness of the vehicle or a connector at the rear portion of the vehicle so that the trailer turn signals lights or brakes lights or brakes operate in conjunction with the vehicle's turn signals lights or brakes lights or brakes) are plugged in or otherwise connected.

In some implementations, the system makes use of more than one camera. For example, a second camera disposed laterally towards a side of the vehicle may be used to enhance the gap analysis as a camera disposed laterally towards a side of the vehicle (as opposed to a centrally located camera) may have a better perspective of any gap between the trailer tongue and the hitch ball. The central camera may be used to determine when a trailer is hitched at the vehicle and may be used to make an initial determination of an error in hitching of the trailer at the vehicle, and the sideward positioned camera may be used to confirm the error or to determine a degree of error or misalignment of the trailer hitch at the hitch ball. Optionally, the system may include a single camera laterally disposed toward a side of the vehicle.

The control, after detecting a deficiency in the connection between the trailer and the hitch (e.g., a deficiency in seating of the trailer tongue onto the hitch ball, a deficiency in or lack of locking the trailer tongue at the hitch ball, a deficiency in connecting the trailer's safety chains to the vehicle and/or a deficiency in connecting the trailer's wire harness to the vehicle's electrical connector), may notify or warn an operator of the vehicle. For example, the system may provide an audible alert or display a notification on a display integrated within the vehicle. For example, when the system determines that the trailer chains are not properly connected, an appropriate message may be displayed (with or without an audible alert) alerting the operator to the deficiency. The displayed alert may comprise a message stating what the determined deficiency is, or may comprise an image or video display of the determined deficiency via video images derived from image data captured by the rearward viewing camera. Optionally, and such as for applications where the rearward viewing camera comprises the rear backup camera of the vehicle, the video images displayed may include a graphic overlay that highlights the determined deficiency (e.g., changes color of that portion of the displayed image or adds a graphic overlay demarcation at or around the determined deficiency, or flashes the portion of the displayed images that show the determined deficiency or the like). Optionally, the system may determine that the trailer wire harness is not connected (either via processing of captured image data or via electrical signal monitoring of the vehicle harness to, for example, determine whether or not there is additional current draw for turn signals or brake lights which would be indicative of whether or not the trailer harness is connected), and may generate an alert to the driver that the harness is not connected.

In situations where a hitch deficiency is determined and an alert generated, but the driver proceeds with operating the vehicle, the system may override driver control of the vehicle and preclude driving of the vehicle. Optionally, the system may preclude driving of the vehicle based at least in part on the severity or degree of the deficiency. For example, if the system determines a severe deficiency, such as the trailer tongue is not at all seated on the hitch ball and the chains are not attached, then the system may preclude operation of the vehicle until the deficiencies are corrected. Optionally, if any deficiency is determined (e.g., a deficiency in seating of the trailer tongue onto the hitch ball, a deficiency in locking the trailer tongue at the hitch ball, a deficiency in connecting the trailer's safety chains to the vehicle or a deficiency in connecting the trailer's wire harness to the vehicle's electrical connector), the system may preclude operation of the vehicle until the deficiency or deficiencies are corrected. The alert generated to the driver may include an indication of the determined deficiency and type of deficiency, and may further include an indication that the vehicle cannot be operated until the deficiency is corrected.

Thus, the present invention discloses a vehicular rear vision system with trailer connection verification. By performing object detection using one or more rearward facing cameras, a control may determine or detect deficiencies in the connection between the trailer and the hitch. The system may alert or notify an operator of the vehicle to any detected deficiencies. For example, the system may generate a notification on a display of the vehicle.

The system may utilize aspects of the trailering or trailer angle detection systems or trailer hitch assist systems described in U.S. Pat. Nos. 9,085,261 and/or 6,690,268, and/or U.S. Publication Nos. US-2019-0064831; US-2019-0016264; US-2018-0276839; US-2018-0276838; US-2018-0253608; US-2018-0215382; US-2018-0211528; US-2017-0254873; US-2017-0217372; US-2017-0050672; US-2015-0217693; US-2014-0160276; US-2014-0085472 and/or US-2015-0002670, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailer hitching assist system, the vehicular trailer hitching assist system comprising:
   a rear backup camera disposed at a rear portion of a vehicle equipped with the vehicular trailer hitching assist system, the rear backup camera viewing at least rearward of the vehicle, wherein at least a hitching portion of a trailer hitched to a hitch of the vehicle is viewed by the rear backup camera;
   wherein the rear backup camera comprises an imaging array having at least one million photosensor elements arranged in rows and columns;
   wherein the rear backup camera is operable to capture image data;
   an image processor operable to process the image data captured by the rear backup camera;
   wherein the image data captured by the rear backup camera is processed at the image processor;
   wherein the vehicular trailer hitching assist system, via processing at the image processor of the image data captured by the rear backup camera, determines an incorrect connection of the hitching portion of the trailer to the hitch of the vehicle, and wherein the incorrect connection comprises a gap between the hitching portion of the trailer and a hitch ball of the hitch of the vehicle; and
   wherein the vehicular trailer hitching assist system, responsive to determination of the incorrect connection of the hitching portion of the trailer to the hitch of the vehicle, alerts a driver of the vehicle of the determined incorrect connection of the hitching portion of the trailer to the hitch of the vehicle.

2. The vehicular trailer hitching assist system of claim 1, further comprising a second camera disposed at a rear and side portion of the vehicle and viewing exterior and at least rearward of the vehicle, wherein at least a second portion of the trailer hitched to the vehicle is viewed by the second camera, and wherein image data captured by the second camera is processed at the image processor to determine presence of the gap between the hitching portion of the trailer and the hitch ball of the hitch of the vehicle.

3. The vehicular trailer hitching assist system of claim 1, wherein the incorrect connection comprises an incorrect locking of a hitch lock mechanism of the hitching portion of the trailer.

4. The vehicular trailer hitching assist system of claim 1, wherein the vehicular trailer hitching assist system, responsive to determination of the incorrect connection of the hitching portion of the trailer to the hitch of the vehicle, alerts the driver of the vehicle via a visual alert.

5. The vehicular trailer hitching assist system of claim 1, wherein the incorrect connection comprises an incorrect attachment of a trailer tongue of the hitching portion of the trailer to the hitch ball of the hitch of the vehicle.

6. The vehicular trailer hitching assist system of claim 1, wherein the incorrect connection comprises an incorrect connection of a safety chain of the trailer to the vehicle.

7. The vehicular trailer hitching assist system of claim 1, wherein the incorrect connection comprises an incorrect electrical connection of a wire harness of the trailer to a wire connector of the vehicle.

8. The vehicular trailer hitching assist system of claim 1, further comprising a display disposed in the vehicle and viewable by the driver of the vehicle, and wherein the vehicular trailer hitching assist system, responsive to determination of the incorrect connection of the hitching portion of the trailer to the hitch of the vehicle, alerts the driver via the display.

9. The vehicular trailer hitching assist system of claim 8, wherein the display indicates the determined incorrect connection of the hitching portion of the trailer to the hitch of the vehicle.

10. The vehicular trailer hitching assist system of claim 9, wherein, responsive to determination of the incorrect connection of the hitching portion of the trailer to the hitch of the vehicle, the display displays video images derived from the image data captured by the rear backup camera, the displayed video images showing the hitching portion of the trailer at the hitch of the vehicle.

11. The vehicular trailer hitching assist system of claim 1, wherein the vehicular trailer hitching assist system, responsive to determination of the incorrect connection of the hitching portion of the trailer to the hitch of the vehicle, alerts the driver of the vehicle via an audible alert.

12. The vehicular trailer hitching assist system of claim 11, wherein the audible alert indicates the determined incorrect connection of the hitching portion of the trailer to the hitch of the vehicle.

13. The vehicular trailer hitching assist system of claim 1, wherein the hitching portion of the trailer comprises a trailer tongue that hitches at the hitch ball of the hitch of the vehicle, and wherein the vehicular trailer hitching assist system, via processing at the image processor of the image data captured by the rear backup camera, performs gap analysis to determine that the gap is present between the trailer tongue of the hitching portion of the trailer and the hitch ball of the hitch of the vehicle.

14. The vehicular trailer hitching assist system of claim 1, wherein the vehicular trailer hitching assist system overrides driver control of the vehicle responsive to determination of the incorrect connection of the hitching portion of the trailer to the hitch of the vehicle.

15. The vehicular trailer hitching assist system of claim 1, wherein the vehicular trailer hitching assist system limits operation of the vehicle responsive to determination of the incorrect connection of the hitching portion of the trailer to the hitch of the vehicle.

16. The vehicular trailer hitching assist system of claim 1, wherein the image processor comprises an image processing chip.

17. The vehicular trailer hitching assist system of claim 1, comprising an electronic control unit (ECU), and wherein the ECU comprises electronic circuitry, and wherein the electronic circuitry includes the image processor, and wherein the image data captured by the rear backup camera is transferred to and is processed at the ECU.

18. A vehicular trailer hitching assist system, the vehicular trailer hitching assist system comprising:

a rear backup camera disposed at a rear portion of a vehicle equipped with the vehicular trailer hitching assist system, the rear backup camera viewing at least rearward of the vehicle, wherein at least a hitching portion of a trailer hitched to a hitch of the vehicle is viewed by the rear backup camera;

wherein the rear backup camera comprises an imaging array having at least one million photosensor elements arranged in rows and columns;

wherein the rear backup camera is operable to capture image data;

an electronic control unit (ECU), and wherein the ECU comprises electronic circuitry, and wherein the electronic circuitry includes an image processor operable to process the image data captured by the rear backup camera;

wherein the image data captured by the rear backup camera is transferred to the ECU and is processed at the image processor;

wherein the vehicular trailer hitching assist system, via processing at the image processor of the image data captured by the rear backup camera, determines an incorrect connection of the hitching portion of the trailer to the hitch of the vehicle, and wherein the incorrect connection comprises a gap between the hitching portion of the trailer and a hitch ball of the hitch of the vehicle; and wherein the vehicular trailer hitching assist system, responsive to determination of the incorrect connection of the hitching portion of the trailer to the hitch of the vehicle, limits operation of the vehicle.

19. The vehicular trailer hitching assist system of claim 18, wherein the incorrect connection comprises an incorrect locking of a hitch lock mechanism of the hitching portion of the trailer.

20. The vehicular trailer hitching assist system of claim 18, wherein the incorrect connection comprises an incorrect attachment of a trailer tongue of the hitching portion of the trailer to the hitch ball of the hitch of the vehicle.

21. The vehicular trailer hitching assist system of claim 18, wherein the incorrect connection comprises an incorrect connection of a safety chain of the trailer to the vehicle.

22. The vehicular trailer hitching assist system of claim 18, wherein the incorrect connection comprises an incorrect electrical connection of a wire harness of the trailer to a wire connector of the vehicle.

23. The vehicular trailer hitching assist system of claim 18, wherein the vehicular trailer hitching assist system, responsive to determination of the incorrect connection of the hitching portion of the trailer to the hitch of the vehicle, alerts a driver via a display disposed in the vehicle and viewable by the driver of the vehicle.

24. The vehicular trailer hitching assist system of claim 23, wherein, responsive to determination of the incorrect connection of the hitching portion of the trailer to the hitch of the vehicle, the display displays video images derived from the image data captured by the rear backup camera, the displayed video images showing the hitching portion of the trailer at the hitch of the vehicle.

25. The vehicular trailer hitching assist system of claim 18, wherein the vehicular trailer hitching assist system, responsive to determination of the incorrect connection of the hitching portion of the trailer to the hitch of the vehicle, alerts a driver of the vehicle via an audible alert.

26. The vehicular trailer hitching assist system of claim 18, wherein the image processor comprises an image processing chip.

27. A vehicular trailer hitching assist system, the vehicular trailer hitching assist system comprising:

a rear backup camera disposed at a rear portion of a vehicle equipped with the vehicular trailer hitching assist system, the rear backup camera viewing at least rearward of the vehicle, wherein at least a hitching portion of a trailer hitched to a hitch of the vehicle is viewed by the rear backup camera;

wherein the rear backup camera comprises an imaging array having at least one million photosensor elements arranged in rows and columns;

wherein the rear backup camera is operable to capture image data;

an image processor operable to process the image data captured by the rear backup camera;

wherein the image data captured by the rear backup camera is processed at the image processor;

wherein the vehicular trailer hitching assist system, via processing at the image processor of the image data captured by the rear backup camera, determines an incorrect connection of the hitching portion of the trailer to the hitch of the vehicle;

wherein the incorrect connection comprises a gap between the hitching portion of the trailer and a hitch ball of the hitch of the vehicle and at least one selected from the group consisting of (i) an incorrect attachment of a trailer tongue of the hitching portion of the trailer to the hitch ball of the hitch of the vehicle, (ii) an incorrect connection of a safety chain of the trailer to the vehicle, (iii) an incorrect locking of a hitch lock mechanism of the hitching portion of the trailer and (iv) an incorrect electrical connection of a wire harness of the trailer to a wire connector of the vehicle; and wherein the vehicular trailer hitching assist system, responsive to determination of the incorrect connection of the hitching portion of the trailer to the hitch of the vehicle, at least one selected from the group consisting of (i) alerts a driver of the vehicle of the determined incorrect connection of the hitching portion of the trailer to the hitch of the vehicle and (ii) limits operation of the vehicle.

28. The vehicular trailer hitching assist system of claim 27, wherein the vehicular trailer hitching assist system, responsive to determination of the incorrect connection of the hitching portion of the trailer to the hitch of the vehicle, alerts the driver via a display disposed in the vehicle and viewable by the driver of the vehicle.

29. The vehicular trailer hitching assist system of claim 28, wherein, responsive to determination of the incorrect connection of the hitching portion of the trailer to the hitch of the vehicle, the display displays video images derived from the image data captured by the rear backup camera, the displayed video images showing the hitching portion of the trailer at the hitch of the vehicle.

30. The vehicular trailer hitching assist system of claim 27, wherein the vehicular trailer hitching assist system, responsive to determination of the incorrect connection of the hitching portion of the trailer to the hitch of the vehicle, alerts the driver of the vehicle via an audible alert.

31. The vehicular trailer hitching assist system of claim 27, wherein the image processor comprises an image processing chip.

32. The vehicular trailer hitching assist system of claim 27, comprising an electronic control unit (ECU), and wherein the ECU comprises electronic circuitry, and wherein the electronic circuitry includes the image processor, and wherein the image data captured by the rear backup camera is transferred to and is processed at the ECU.

* * * * *